United States Patent
Col (10) Patent No.: US 6,629,234 B1
(45) Date of Patent: Sep. 30, 2003

(54) SPECULATIVE GENERATION AT ADDRESS GENERATION STAGE OF PREVIOUS INSTRUCTION RESULT STORED IN FORWARD CACHE FOR USE BY SUCCEEDING ADDRESS DEPENDENT INSTRUCTION

(75) Inventor: Gerard M. Col, Austin, TX (US)

(73) Assignee: IP. First, L.L.C., Fremont, CA (US)

( * ) Notice: Subject to any disclaimer, the term of this patent is extended or adjusted under 35 U.S.C. 154(b) by 0 days.

(21) Appl. No.: 09/539,022

(22) Filed: Mar. 30, 2000

(51) Int. Cl.$^7$ ................................................ G06F 9/38
(52) U.S. Cl. .................... 712/219; 711/118; 712/216
(58) Field of Search .................... 711/118; 712/216, 712/219

(56) References Cited

U.S. PATENT DOCUMENTS

| | | | | |
|---|---|---|---|---|
| 5,043,868 A | * | 8/1991 | Kitamura et al. ............ | 712/218 |
| 5,442,767 A | * | 8/1995 | Eickemeyer et al. ........... | 711/1 |
| 5,487,153 A | | 1/1996 | Hammerstrom et al. .... | 709/100 |
| 5,687,349 A | | 11/1997 | McGarity .................... | 711/137 |
| 5,701,426 A | | 12/1997 | Ryan .............................. | 711/3 |
| 5,768,610 A | * | 6/1998 | Pflum .......................... | 712/23 |
| 5,867,724 A | | 2/1999 | McMahon .................... | 712/22 |
| 6,021,471 A | | 2/2000 | Stiles et al. ................... | 711/140 |
| 6,085,292 A | | 7/2000 | McMcormack et al. .... | 711/140 |
| 6,148,391 A | | 11/2000 | Petrick ........................ | 712/202 |
| 6,209,076 B1 | | 3/2001 | Blomgren ...................... | 711/214 |
| 6,343,359 B1 | | 1/2002 | Col et al. .................... | 712/245 |
| 6,412,043 B1 | | 6/2002 | Chopra ........................ | 711/118 |
| 2002/0049895 A1 | * | 4/2002 | Inoue ........................... | 712/217 |

FOREIGN PATENT DOCUMENTS

EP 0402787 A2 12/1990

OTHER PUBLICATIONS

Jim Handy, The Cache Memory Book, Second Edition, Figure 2.4.

Liapasti et al., "Exceeding the Dataflow Limit via Value Prediction," Proceedings of the $29^{th}$ Annual IFEE/ACM International, *Symposium on Microarchitecture*, pp. 226–237.

* cited by examiner

*Primary Examiner*—Kenneth S. Kim
(74) *Attorney, Agent, or Firm*—Richard K. Huffman; James W. Huffman (57) ABSTRACT

An apparatus is presented for expediting the execution of address-dependent micro instructions in a pipeline microprocessor. The apparatus computes a speculative result associated with an arithmetic operation, where the arithmetic operation is prescribed by a preceding micro instruction that is yet to generate a result. The apparatus utilizes the speculative result to configure a speculative address operand that is provided to an address-dependent micro instruction The apparatus includes speculative operand calculation logic and an update forwarding cache. The speculative operand calculation logic performs the arithmetic operation to generate the speculative result prior to when execute logic executes the preceding micro instruction to generate the result. The update forwarding cache is coupled to the speculative operand calculation logic and temporarily stores the speculative result, where address-dependent micro instructions can retrieve a configured speculative address operand, thereby permitting them to proceed without incurring delay.

12 Claims, 6 Drawing Sheets

*Arithmetic Address Generation Interlock (AGI)*

| Cycle | Translate | Register | Address | Load | Align | Execute | Store | Write Back |
|---|---|---|---|---|---|---|---|---|
| 1 | ADD EAX,25 | *** | *** | *** | *** | *** | *** | *** |
| 2 | SUB EBX, 27 | ADD EAX,EAX,25 | *** | *** | *** | *** | *** | *** |
| 3 | MOV ECX,[EAX] | SUB EBX,EBX,27 | ADD EAX,EAX,25 | *** | *** | *** | *** | *** |
| 4 | *** | --- | SUB EBX,EBX,27 | ADD EAX,EAX,25 | *** | *** | *** | *** |
| 5 | *** | --- | --- | SUB EBX,EBX,27 | ADD EAX,EAX,25 | *** | *** | *** |
| 6 | *** | --- | --- | --- | SUB EBX,EBX,27 | ADD EAX,EAX,25 | *** | *** |
| 7 | *** | LD ECX,[EAX] | --- | --- | --- | SUB EBX,EBX,27 | ADD EAX,EAX,25 | *** |
| 8 | *** | *** | LD ECX,[EAX] | | | | SUB EBX,EBX,27 | ADD EAX,EAX,25 |
| 9 | | | | | | | | SUB EBX,EBX,27 |

Avoiding Arithmetic AGI Using Speculative Address Operand

| Cycle | Translate | Register | Address | Load | Align | Execute | Store | Write Back |
|---|---|---|---|---|---|---|---|---|
| 1 | ADD EAX,25 | *** | *** | *** | *** | *** | *** | *** |
| 2 | SUB EBX, 27 | ADD EAX,EAX,25 | *** | *** | *** | *** | *** | *** |
| 3 | MOV ECX,[EAX] | SUB EBX,EBX,27 | ADD EAX,EAX,25 | *** | *** | *** | *** | *** |
| 4 | *** | LD ECX,[EAX] | SUB EBX,EBX,27 | ADD EAX,EAX,25 | *** | *** | *** | *** |
| 5 | *** | *** | LD ECX,[EAX] | SUB EBX,EBX,27 | ADD EAX,EAX,25 | *** | *** | *** |
| 6 | *** | *** | *** | LD ECX,[EAX] | SUB EBX,EBX,27 | ADD EAX,EAX,25 | *** | *** |
| 7 | *** | *** | *** | *** | LD ECX,[EAX] | SUB EBX,EBX,27 | ADD EAX,EAX,25 | *** |
| 8 | *** | *** | *** | *** | *** | LD ECX,[EAX] | SUB EBX,EBX,27 | ADD EAX,EAX,25 |
| 9 | *** | *** | *** | *** | *** | *** | LD ECX,[EAX] | SUB EBX,EBX,27 |

SPECULATIVE GENERATION AT ADDRESS GENERATION STAGE OF PREVIOUS INSTRUCTION RESULT STORED IN FORWARD CACHE FOR USE BY SUCCEEDING ADDRESS DEPENDENT INSTRUCTION

CROSS-REFERENCE TO RELATED APPLICATIONS

This application is related to U.S. patent application Ser. No. 09/434086 filed on Nov. 5, 1999 entitled UPDATE FORWARDING CACHE FOR ADDRESS MODE, now issued U.S. Pat. No. 6,442,673 by common inventors, and having the same assignee as this application.

BACKGROUND OF THE INVENTION

1. Field of the Invention

This invention relates in general to the field of instruction execution in computers, and more particularly to an apparatus in a pipeline microprocessor for providing speculative address operands to address-dependent micro instructions.

2. Description of the Related Art

A pipeline microprocessor has an instruction path, or pipeline, that sequentially executes instructions from an application program in synchronization with a pipeline clock signal. The instruction pipeline is divided into stages and each of the stages perform specific sub-operations that together accomplish a higher level operation prescribed by a program instruction. The program instructions in the application program are executed in sequence by the microprocessor. As an instruction enters the first stage of the pipeline, certain sub-operations are accomplished. The instruction is then passed to subsequent stages in the pipeline where subsequent sub-operations are accomplished. After performing the last set of sub-operations in the last stage of the pipeline, the instruction completes execution and exits the pipeline. Execution of instructions by a pipeline microprocessor is very similar to the manufacture of items on an assembly line.

Early pipeline microprocessors were not sophisticated enough to allow the execution of multiple instructions in different pipeline stages at the same time; that is, they executed one instruction at a time. More specifically, a given instruction would be fetched from memory and would proceed through all of the pipeline stages until it completed execution. Following this, a next instruction would be fetched and proceed through the pipeline stages through completion. And although this approach is not very efficient in terms of instruction throughput, since early pipeline microprocessors had only a few pipeline stages, the inefficient utilization of stage resources was not deemed to be a significant performance limitation.

However, as microprocessors began to proliferate, more stringent requirements were imposed on microprocessor designers, particularly with respect to instruction throughput. And the obvious approach for increasing throughput was to provide for the execution of multiple instructions within the pipeline. Clearly this improvement increased performance because resources within each pipeline stage were more efficiently used. But with this architectural change came a problem: What if one instruction executing in an early pipeline stage required an operand that was yet to be generated by a preceding instruction executing in a subsequent pipeline stage? This issue is in fact frequently confronted in the art because one of the foremost characteristics of application programs is that instructions in close proximity to one another tend to perform tasks using the same operand. For instance, a typical control algorithm within an application program computes a true signal value by adding a small number to a currently generated signal value and then the sum is compared to a reference signal. The structure of the control algorithm is to add a first operand to a second operand to produce a result. Then the result is tested to see if the computed value is within tolerance. If not, then the first operand is added again to the computed result to obtain a second result. Then the second result is tested. And so on. Even in this simple algorithm it is evident that every other instruction utilizes the last computed result.

When a given instruction executing in one stage of the pipeline requires an operand that is yet to be generated by a preceding instruction that is proceeding through a subsequent stage of the pipeline, the given instruction is referred to as a dependent instruction. This is because the operand required by the dependent instruction depends upon generation of a result by the preceding instruction.

To deal with dependent instructions, microprocessor designers added interlock logic to existing pipeline designs. The interlock logic spans the stages of a microprocessor where dependencies occur. During execution of a sequence of instructions by the microprocessor, non-dependent instructions are successively advanced through the pipeline stages in synchronization with the clock. However, when a dependent instruction is detected, the interlock logic stalls execution of the dependent instruction by inserting slips into the pipeline until the operand required by the dependent instruction is generated by a preceding instruction. The number of slips that are inserted into the pipeline directly influence the amount of delay that is experienced by an application program executing on the microprocessor. Two factors drive the number of slips that are inserted: 1) the separation in the instruction pipeline between the preceding instruction and the dependent instruction; and 2) the number of clock cycles that are needed by the preceding instruction to actually generate the operand. This application focuses on problems associated with the separation between the two instructions in the pipeline.

In general, program instructions use operands for two distinct types of computations in a present day microprocessor: address computations and result computations. Address computations are performed early in the pipeline by address stage logic to compute addresses of memory operands that are to be loaded from memory or stored to memory. Result computations are performed in a later execution stage of the microprocessor to carry out arithmetic, logical, or other operations prescribed by program instructions.

A particular class of dependencies called address dependency occurs when a preceding instruction has not yet generated a result of a result computation that is presently required as an operand for a dependent-instruction for use in an address computation. The instruction prescribing the address computation is called an address-dependent instruction. And because the address-dependent instruction requires the result that has not yet been generated by the preceding instruction, the interlock logic prevents the address-dependent instruction from proceeding in the pipeline until the preceding instruction generates and provides the result.

If there are only two pipeline stages separating the address computation logic from the result computation logic, then at least two slips must be inserted into the pipeline to delay the address-dependent instruction until the preceding instruction provides the result. But if there are 10 stages separating the address computation logic from the result computation logic, then at least 10 slips are required. Furthermore, microprocessor designers are progressively increasing the number of stages in microprocessor pipelines to provide overall throughput improvements. Consequently, these improvements negatively impact address-dependency delays because address-dependent instructions must be stalled for a greater number of clock cycles.

Therefore, what is needed is an apparatus in a pipeline microprocessor that allows address-dependent instructions to proceed without experiencing stalls.

In addition, what is needed is an interim result computation apparatus that can provide speculative address operands to address-dependent instructions prior to when a preceding instruction generates a final result.

Furthermore, what is needed is an apparatus for generating and temporarily storing intermediate results, and for providing these results to address-dependent instructions, thus allowing the address-dependent instructions to proceed without being delayed.

SUMMARY OF THE INVENTION

To address the above-detailed deficiencies, it is an object of the present invention to provide a pipeline microprocessor apparatus for speculatively permitting address-dependent instructions to proceed without experiencing delays.

Accordingly, in the attainment of the aforementioned object, it is a feature of the present invention to provide an apparatus in a pipeline microprocessor for providing a speculative address operand associated with a result of an arithmetic operation, the arithmetic operation being prescribed by a preceding micro instruction. The apparatus includes speculative operand calculation logic and an update forwarding cache. The speculative operand calculation logic is within an address stage of the pipeline microprocessor and performs the arithmetic operation to generate the speculative address operand prior to when execute logic executes the preceding micro instruction to generate the result. The speculative address operand is obtained from the result that is to be generated when the execute logic executes the preceding micro instruction, where the result has not yet been generated by the execute logic and written to a resister file for access by following micro instructions. The result is required by an address-dependent micro instruction within the address stage for computation of a memory address. The speculative operand calculation logic has addition logic, an arithmetic opcode decoder, and subtraction logic. The addition logic sums a first source operand with a second source operand, where the source operands are prescribed by the preceding micro instruction. The arithmetic opcode decoder directs the addition logic to sum the source operands if the arithmetic operation prescribed by the preceding micro instruction is an addition operation. The subtraction logic is coupled to the arithmetic opcode decoder and subtracts the second source operand from said first source operand. If the arithmetic operation is a subtraction operation, then the arithmetic opcode decoder directs the subtraction logic to subtract the second source operand from the first source operand. The update forwarding cache is coupled to the speculative operand calculation logic. The update forwarding cache temporarily stores the speculative address operand where the address-dependent micro instruction can retrieve the speculative address operand, thereby permitting the address-dependent micro instruction to proceed without incurring delay. The speculative address operand is provided by the update forwarding cache to the address-dependent micro instruction prior to when the address-dependent micro instruction enters the address stage, thereby allowing the address-dependent micro instruction to generate the memory address without incurring said delay, and wherein said update forwarding cache comprises a plurality of cache buffers, each of the plurality of cache buffers corresponding to each of a plurality of speculative operands.

An advantage of the present invention is that application programs are not delayed when address dependencies are associated with arithmetic results. Another object of the present invention is to provide an apparatus in a pipeline microprocessor for computing interim results that can provide speculative address operands to address-dependent instructions prior to when a preceding instruction generates a final result.

In another aspect, it is a feature of the present invention to provide a speculative operand apparatus in a pipeline microprocessor. The speculative operand apparatus has address stage logic, a speculative operand cache, and speculative operand configuration logic. The address stare logic generates a memory address prescribed by an address-dependent micro instruction. The address stage logic includes a speculative address operand calculator, a speculative operand cache, and speculative operand configuration logic. The speculative address operand calculator generates a first interim result by performing an arithmetic operation prescribed by a preceding micro instruction. The preceding micro instruction corresponds to one of the following x86 macro instructions: ADD, MOV, INC, SUB, or DEC. The arithmetic operation is performed prior to generation of a final result by the preceding micro instruction, where the final result is generated when the preceding micro instruction is executed by execute logic within the pipeline microprocessor. The final result is stored in a register for access by following micro instructions. The speculative address operand calculator includes an adder, arithmetic opcode decoding logic, and a subtractor. The adder sums a first source operand with a second source operand, where the source operands are prescribed by the preceding micro instruction. The arithmetic opcode decoding logic directs the adder to sum the source operands if the arithmetic operation is an addition operation. The subtractor is coupled to the arithmetic opcode decoding logic. The subtractor subtracts the second source operand from the first source operand. If the arithmetic operation is a subtraction operation, then the arithmetic opcode decoding logic directs the subtractor to subtract the second source operand from the first source operand. The speculative operand cache is coupled to the address stage logic. The speculative operand cache temporarily stores the first interim result, wherein the speculative operand cache comprises a plurality of cache buffers, each of the plurality of cache buffers corresponding to each of a plurality of interim results. The speculative operand configuration logic is coupled to the speculative operand cache. The speculative operand configuration logic accesses the first interim result to configure a speculative address operand corresponding to contents of the register prescribed by the address-dependent micro instruction, thereby permitting the memory address to be generated in lieu of a stall.

Another advantage of the present invention is that the present invention provides an apparatus to improve the performance of application programs that is insensitive to the number of stages separating address-dependent instructions from preceding instructions.

A further object of the invention is to provide a microprocessor apparatus that generates and temporarily stores interim results, whereby these interim results can be accessed by address-dependent instructions and used as speculative address operands.

In a further aspect, it is a feature of the present invention to provide a microprocessor apparatus for providing a speculative operand to an address-dependent micro instruction, the speculative operand corresponding to a result of a preceding arithmetic micro instruction, where the result is yet to be generated by execute stage logic in the microprocessor. The apparatus includes an opcode decoder, intermediate result calculation logic, operand cache entries, and speculative operand configuration logic. The opcode decoder evaluates an opcode of the preceding arithmetic micro instruction.

The intermediate result calculation logic is coupled to the opcode decoder. The intermediate result calculation logic generates intermediate results corresponding to arithmetic micro instructions. The intermediate result calculation logic has addition logic and subtraction logic. The addition logic generates additive intermediate results. The subtraction logic generates subtractive intermediate results. The operand cache entries are coupled to the intermediate result calculation logic. The operand cache entries temporarily store the additive intermediate results and the subtractive intermediate results. The speculative operand configuration logic is coupled to the operand cache entries. The speculative operand configuration logic selects words from selected operand cache entries to configure the speculative operand.

A further advantage of the present invention is that address generation interlock stalls are not required when an address-dependent instruction requires the result of an arithmetic computation prescribed by a preceding instruction.

BRIEF DESCRIPTION OF THE DRAWINGS

These and other objects, features, and advantages of the present invention will become better understood with regard to the following description, and accompanying drawings where.

DETAILED DESCRIPTION

In light of the above background on techniques for executing program instructions in a pipeline microprocessor, several related art examples will now be discussed with reference to FIGS. 1 and 2. These examples highlight the problems encountered in a pipeline microprocessor when an address-dependent micro instruction immediately requires the result of a preceding micro instruction, where the result has not yet been generated by the preceding micro instruction. More specifically, in this situation the address-dependent micro instruction must be stalled in the pipeline until the preceding micro instruction is executed to the point that the result is generated. Following this discussion, a detailed description of the present invention will be provided with reference to FIGS. 3 through 6. The present invention provides an apparatus that computes and stores speculative address operands resulting from arithmetic operations prior to execution of the instructions prescribing the arithmetic operations, thereby allowing address-dependent micro instructions to access these operands without experiencing a stall.

Figure 1:
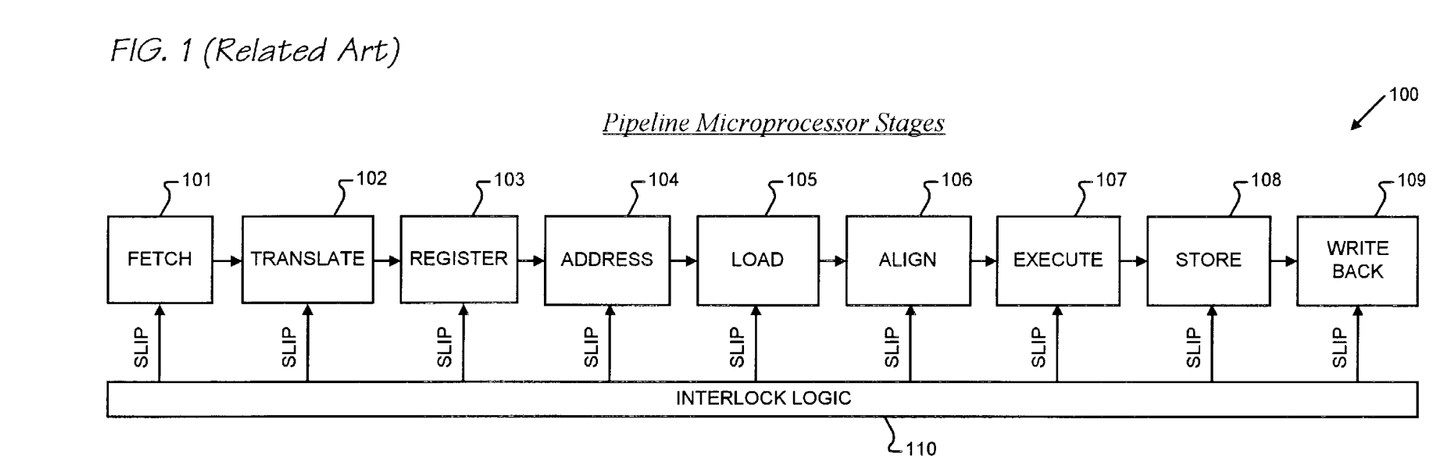
FIG. 1 is a block diagram illustrating stages of a related art pipeline microprocessor.

Referring to FIG. 1, a block diagram is presented illustrating stages of a related art pipeline microprocessor 100. The microprocessor 100 includes a fetch stage 101, translate stage 102, register stage 103, address stage 104, load stage 105, align stage 106, execute stage 107, store stage 108, and write back stage 109. The microprocessor also has interlock logic 110 coupled to each of the pipeline stages 101–109.

In operation, the fetch stage 101 retrieves macro instructions from external memory (not shown) that are to be executed by the microprocessor 100. The translate stage 102 translates, or decodes, the fetched macro instructions into associated micro instructions. The register stage 103 retrieves operands specified by the micro instructions from a register file (not shown) for use by logic (not shown) within subsequent stages 104–109 of the pipeline. The address stage 104 generates memory addresses specified by the micro instructions to be used in data storage and retrieval operations. The load stage 105 reads data from the external memory to access memory operands using the addresses generated in the address stage 104. The align stage 106 extracts the memory operands from the data and aligns the memory operands for execution. The execute stage 107 performs arithmetic, logical, or other prescribed operations to generate results using the operands retrieved from the register file and/or memory. The store stage 108 writes the results generated by the execute stage 107 or the operands retrieved from the register file to external memory at the memory addresses calculated by logic in the address stage 104. The write back stage 109 updates registers in the register file with the results generated in the execute stage 107 or with operands retrieved from memory by the load stage 105. Micro instructions proceed in sequence through each successive stage of the pipeline in synchronization with a pipeline clock signal (not shown). To achieve optimum pipeline performance, while a given micro instruction is executing in a given stage of the pipeline, a preceding micro instruction should be executing in a subsequent pipeline stage and a following micro instruction should be executing in a previous pipeline stage. In other words, during any given clock cycle, all stages 101–109 of the microprocessor 100 should be performing their architected functions; no stage should be idle.

But optimum pipeline throughput is rarely attained because of the tremendous diversity of operations that can be prescribed by program instructions and the almost infinite number of ways in which these operations can be combined within software application programs. Consequently, the interlock logic 110 is necessary to control the flow of instructions in the pipeline. For instance, if a micro instruction in the execute stage 107 requires more than one cycle of the pipeline clock to generate a result, then the interlock logic 110 must stall following instructions that are in previous stages 101–106 of the pipeline to prevent the following instructions from prematurely advancing. Preceding instructions that are in subsequent pipeline stages 108–109 are allowed to proceed forward through the pipeline, but since the micro instruction causing the stall remains within the execute stage 107, a "slip" or void is inserted into the store stage 108 during each clock cycle that it remains within the execute stage 107. These slips propagate through the pipeline with each cycle of the clock. Slips cause delays during the execution of application programs.

Because slips are undesirable, microprocessor designers tailor the functions performed and logic provided within the stages 101–109 of a microprocessor 100 to minimize the probability that slips will occur. And one of the most significant causes of slips in a present day pipeline microprocessor 100 ensues from what is referred to as a dependency case. A dependency case exists when a second micro instruction follows a first micro instruction in the execution order, and the second micro instruction requires an operand from the register stage 103, but the operand has not yet been provided to the register stage 103 because it is a result of an operation prescribed by the first micro instruction which is yet to be generated. That is, the operation prescribed by the first micro instruction has not yet been executed to yield the result at the time the result is required by the second micro instruction. In general, when a dependency case is detected within the translate stage 102, the interlock logic 110 stalls the second micro instruction and inserts slips into the pipeline until the result of the first micro instruction is generated by the execute stage 107 and is written back into the register file by logic in the write back stage 109. Once the result is written back into the register file, the interlock logic 110 allows the second micro instruction to proceed into the register stage 103 so it can fetch its operand.

One skilled in the art will appreciate that the microprocessor 100 of FIG. 1 is representative of more recent microprocessors in production today because several pipeline stages are provided. Some more recent microprocessors may have slightly more architected stages than what are shown in FIG. 1; some may have slightly less architected stages. But what is significant to note from FIG. 1, however, is that only two stages access the register file: the register stage 103 and the write back stage 109. And as was briefly stated above, a typical micro instruction retrieves its prescribed operands from the register file in the register stage 103. Within the execute stage 107, execution logic (not shown) performs a prescribed operation using the prescribed operands to generate a result. And within the write back stage 109, the result of the prescribed operation is typically stored to a destination register in the register file so that the result can be accessed by following micro instructions. In contrast to early microprocessors, more recent microprocessors have more stages within their pipeline to provide for an increase in throughput. However, a negative by product of increasing the number of stages is that dependency cases require a greater number of pipeline slips because of the increased number of stages separating the register stage 102 and the write back stage 109.

Dependency related stalls, or dependency interlocks, can occur for a number of different reasons, but typically dependency interlocks fall into two distinct categories: result generation interlocks (RGIs) and address generation interlocks (AGIs). What drives the distribution of interlocks into these two categories is that operands within a pipeline microprocessor 100 are generally used for two corresponding types of computations: result computations in the execute stage 107 and address computations in the address stage 104. That is, result-dependent operands associated with an RGI are required by a micro instruction for a result computation within the execute stage 107; address-dependent operands corresponding to an AGI are required by a micro instruction for an address computation within the address stage 104. This application deals with the problems associated with the latter category of interlocks, address generation interlocks.

Figure 2:
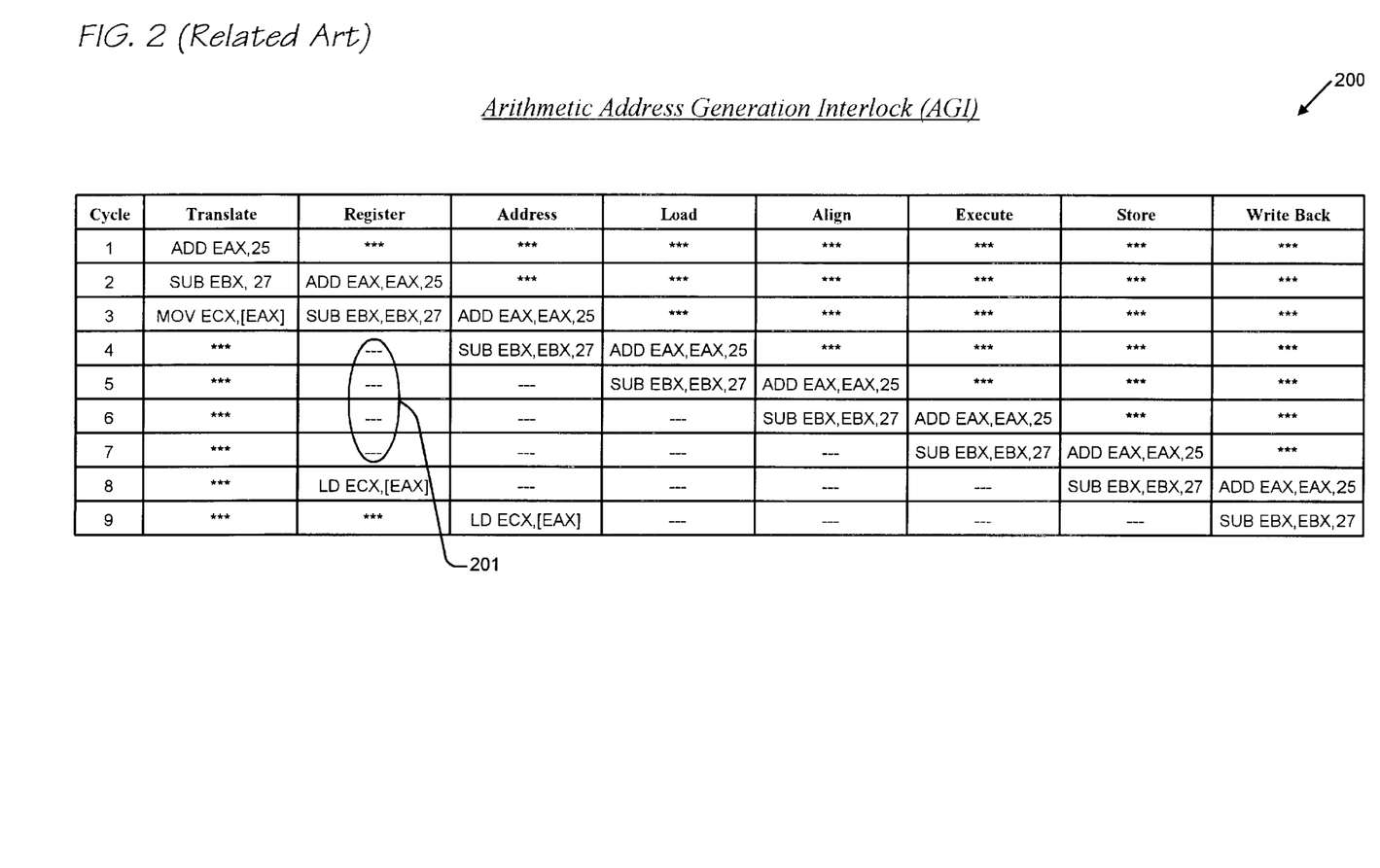
FIG. 2 is a table illustrating execution of an address-dependent micro instruction by the microprocessor of FIG. 1, where an operand required by the address-dependent micro instruction is a result of an arithmetic operation prescribed by a preceding micro instruction.

Now referring to FIG. 2, a table 200 is presented illustrating execution of an address-dependent micro instruction by the microprocessor of FIG. 1, where the operand required by the address-dependent micro instruction is a result of an arithmetic operation directed by a preceding micro instruction. Three macro instructions, a first macro instruction, designated ADD EAX,25; a second macro instruction, designated SUB EBX,27; and a third macro instruction, designated MOV ECX,[EAX]; are shown in the Translate column of the table 200. For clarity of discussion, a column corresponding to the Fetch stage 101 is not shown. The marks *** designate non-relevant instructions before or after the instructions of interest. The marks—designate slips that are inserted into the pipeline by the interlock logic 110. Progression of instructions through noted stages of the pipeline is shown with respect to cycles of a pipeline clock.

The ordering of the three macro instructions in the Translate column is what establishes an address-dependency case. More specifically, the first macro instruction directs logic in the execute stage 107 of the microprocessor 100 to add the contents of register EAX in the register file with a first immediate operand, 25, and to write back the result of the addition into register EAX. The second macro instruction directs logic in the execute stage 107 of the microprocessor 100 to subtract a second immediate operand, 27, from the contents of register EBX in the register file, and write back the result of the subtraction into register EBX. The third macro instruction directs the microprocessor 100 to load the contents of a location in memory into register ECX. And the address operand used to generate the address of the memory location is contained within register EAX. Hence, to compute the address of the memory location, logic in the address stage 104 must read register EAX in the register stage 103 and provide this address operand to address computation logic in the address stage 104. But the contents of register EAX required for the address computation will not be available for access by following instructions until the result of the addition prescribed by the first macro instruction is written back into register EAX. Hence, the third macro instruction, MOV ECX,[EAX], is said to be address-dependent upon the first macro instruction, ADD EAX,25, because the address operand required by the third macro instruction is the result of the first macro instruction. Because an address dependency exists between the first and third macro instructions, the interlock logic 110 must monitor and control progression of these instructions through the microprocessor pipeline.

During cycle 1, the first macro instruction, ADD EAX,25, proceeds through the translate stage 102. Therein, the first macro instruction is decoded into a first micro instruction, designated ADD EAX,EAX,25. More specifically, an opcode field, ADD, prescribes the operation that is to performed, that is, to fetch the contents of a source register, EAX, in the register stage 103, to add the contents of EAX with the first immediate operand, 25, and to write back the result of the addition generated in the execute stage 107 into destination register EAX. The destination register is generally explicitly specified as the field following the opcode of a micro instruction. A first source operand specifier follows the destination register, and a second source operand specifier follows the first source operand specifier.

During cycle 2, the first micro instruction proceeds through the register stage 103. Therein, contents of register EAX are retrieved from the register file. In addition during cycle 2, the second macro instruction, SUB EBX,27, proceeds through the translate stage 102. Therein, the second macro instruction is decoded into a second micro instruction, designated SUB EBX,EBX,27. More specifically, an opcode field, SUB, prescribes the operation that is to performed, that is, to fetch the contents of a source register, EBX, in the register stage 103, to subtract the second immediate operand, 27, from the contents of EBX, and to write back the result of the subtraction generated in the execute stage 107 into destination register EBX.

During cycle 3, the first micro instruction proceeds through the address stage 104. Therein, no operation is performed. This is because logic within the address stage 104 is dedicated to performing address computations and the first micro instruction prescribes an arithmetic operation to be performed in the execute stage 107. Since the first micro instruction does not require generation of an address, it passes through the address stage 104. Also during cycle 3, the second micro instruction proceeds through the register stage 103. Therein, the contents of register EBX are retrieved from the register file. In addition during cycle 3, the third macro instruction proceeds through the translate stage 102. Therein, the third macro instruction is decoded into a third micro instruction, designated LD ECX,[EAX]. More specifically, an opcode field, LD, prescribes the operation that is to performed, that is, to load the contents of a memory location into destination register ECX. The address operand used to compute the address of the memory location is prescribed as the contents of register EAX in the register stage 103.

During cycle 4, the first micro instruction proceeds through the load stage 105. Therein, no operation is performed because the first micro instruction does not prescribe a memory load; it prescribes an arithmetic operation that is to be performed in the execute stage 107. Also during cycle 4, the second micro instruction proceeds through the address stage 104. Therein, no operation is performed. This is because, like the first micro instruction, the second micro instruction prescribes an arithmetic operation to be performed in the execute stage 107 rather than generation of an address in the address stage 104. In addition during cycle 4, the interlock logic 110 stalls the third micro instruction in the translate stage 102 because an address dependency case is detected. More specifically, to compute the memory address prescribed by the third micro instruction, LD ECX, [EAX], the contents of register EAX must be retrieved by the third micro instruction in the register stage 103. But the interlock logic 110 detects that a preceding micro instruction, ADD EAX,EAX,25, has prescribed register EAX as a result destination register, and the result of the addition has not yet been generated because the preceding micro instruction is only within the load stage 105 during cycle 4. Consequently, the interlock logic 110 stalls the third micro instruction and inserts a slip 201 into the pipeline during this cycle, resulting in an address-generation interlock (AGI).

During cycle 5, the interlock logic 110 allows the first and second micro instructions to proceed through the align stage 106 and the load stage 105, respectively. No operations are performed in these stages 106, 105 because the two micro instructions do not prescribe memory load operations. In addition during cycle 5, another AGI slip 201 is inserted into the pipeline by the interlock logic 110 because the contents of register EAX are yet to be provided.

During cycle 6, the first micro instruction proceeds through the execute stage 107. Therein, the prescribed addition operation is performed and a result of the addition is generated. Yet, even though the result is generated in the execute stage 107, it will not be written back into the destination register, EAX, until the first micro instruction proceeds through the write back stage 109. In addition during cycle 6, the second micro instruction proceeds through the align stage 106. Since the second micro instruction does not prescribe an memory load operation, no operation is performed. Also during cycle 6, another AGI slip 201 is inserted into the pipeline by the interlock logic 110 because the contents of register EAX are not yet written back into the register file.

During cycle 7, the first micro instruction proceeds through the store stage 108. Since no memory store operation is prescribed, the first micro instruction passes through the store stage 108. Also during cycle 7, the second micro instruction proceeds through the execute stage 107, therein performing the prescribed subtraction to yield a subtraction result destined for register EBX. In addition during cycle 7, yet another AGI slip 201 is inserted into the pipeline by the interlock logic 110 because the contents of register EAX are not yet available for retrieval from the register file.

During cycle 8, the first micro instruction proceeds through the write back stage 109, therein storing the result of the addition operation in register EAX. The contents of register EAX are therefore available for retrieval by following micro instructions during this clock cycle. At this point execution of the first micro instruction is complete. Also during cycle 8, the second micro instruction proceeds through the store stage 108. Since no memory store operation is prescribed, the second micro instruction passes through the store stage 108. And during cycle 8, the interlock logic 110 releases the interlock on the third micro instruction, thus allowing it to proceed through the register stage 103. Therein, the third micro instruction retrieves the contents of register EAX which were generated as a result of the addition prescribed by the first micro instruction.

During cycle 9, the second micro instruction completes execution in the write back stage 109 by storing the subtraction result in register EBX. Also during cycle 9, the third micro instruction proceeds through the address stage 104. Therein, the address of the memory location for the load operation is generated by address generation logic using the contents of EAX as an address operand.

Address dependency cases like that illustrated in the table 200 cause considerable delays in application programs. Note that the third micro instruction experiences four AGI slips 201 while waiting for the contents of register EAX to be made available. In addition, the slips 201 incurred by address-dependent micro instructions will become more severe as processor designs evolve because the design trend is towards increasing the number of pipeline stages 101–109, and consequently, increasing the number of slips 201 experienced by address-dependent micro instructions.

At first glance, it would appear that the address dependency problems within a present day microprocessor 100 as described with reference to FIGS. 1 and 2 are insurmountable because it is impossible to obtain the result of a computation prior to when the computation is performed. In the case illustrated in FIG. 2, even if special logic were provided to directly route the addition result generated in the execute stage 107 to the register stage 103 during cycle 6, the address-dependent micro instruction would have already incurred two AGI slips 201 by the time that the result is generated.

The present inventors, however, have observed that certain micro instructions, specifically those micro instructions that prescribe register/register or register/immediate addition and subtraction operations, merely pass through the address stage 104 of the microprocessor 100 because these micro instructions do not require an address computation. Furthermore, it is noted that address logic within a typical address stage 104 has the capability to perform simple arithmetic, particularly in an x86-compatible microprocessor, because addition is required to generate x86-compatible addresses.

Therefore, the present invention is provided to overcome one class of address-generation interlocks experienced by present day microprocessors: AGIs depending from micro instructions prescribing register/register and register/immediate addition and subtraction operations. By providing apparatus to speculatively perform these arithmetic operations and temporarily store the results of these operations within an address stage of a microprocessor according to the present invention, following address-dependent micro instructions do not incur any AGI stalls whatsoever. The present invention is more specifically described with reference to FIGS. 3 through 6.

Figure 3:
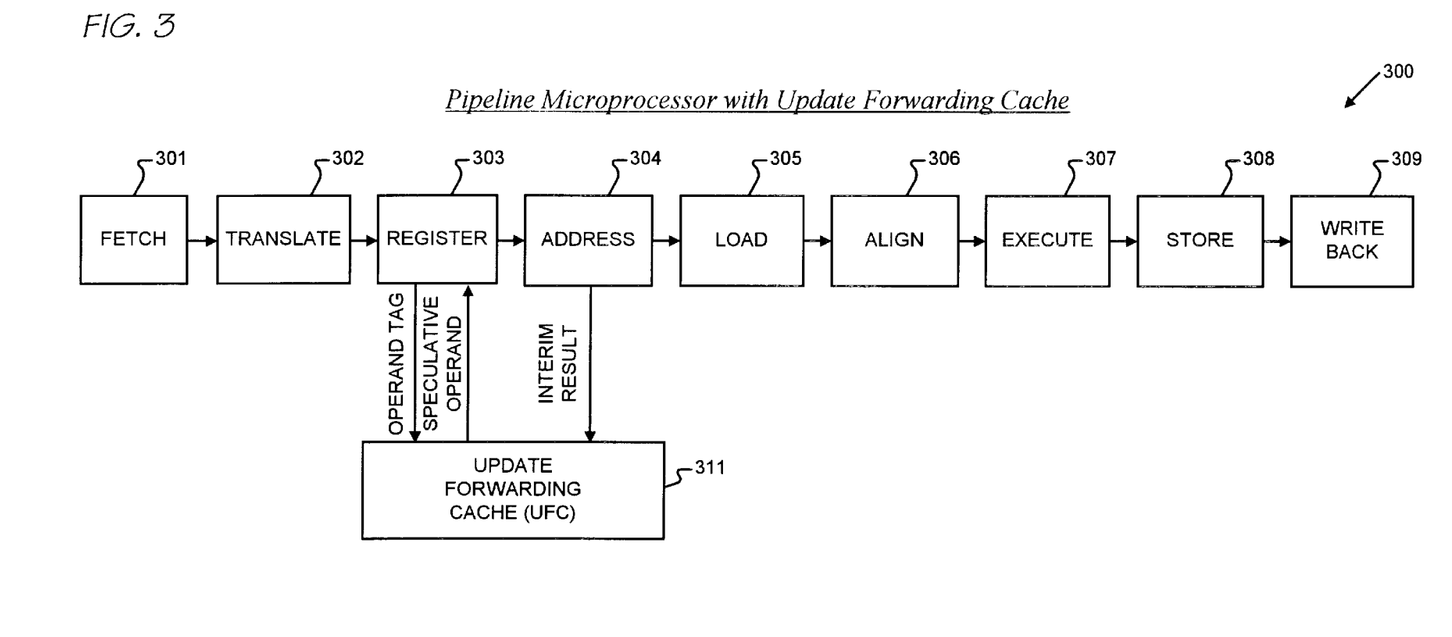
FIG. 3 is a block diagram of a microprocessor according to the present invention featuring an update forwarding cache for temporarily storing and providing speculative address operands.

Referring to FIG. 3, a block diagram is presented of a microprocessor 300 according to the present invention featuring an update forwarding cache 311 for temporarily storing and providing speculative address operands. The microprocessor 300 includes a fetch stage 301, translate stage 302, register stage 303, address stage 304, load stage 305, align stage 306, execute stage 307, store stage 308, and write back stage 309. In addition, the microprocessor 300 includes an update forwarding cache 311 that is coupled to the register stage 303 and the address stage 304.

In operation, the fetch stage 301 retrieves instructions from external memory (not shown) that are to be executed by the microprocessor 300. The translate stage 302 translates the fetched instructions into associated micro instructions. The register stage 303 retrieves operands specified by the micro instructions from a register file (not shown) for use within subsequent stages 304–309 in the pipeline. In addition, address-dependent micro instructions proceeding through the register stage 303 access speculative address operands from the update forwarding cache 311, for use in the computation of addresses in the address stage 304. The address stage 304 calculates memory addresses prescribed by the micro instructions to be used in data storage and retrieval operations. In addition to generating memory addresses, the address stage 304 detects and speculatively executes register/register and register/immediate addition and subtraction micro instructions to generate interim results. The interim results are temporarily stored within update forwarding cache 311 for access by following address-dependent micro instructions which would otherwise be stalled in the translate stage 302. The load stage 305 reads data from memory using the address generated in the address stage 304. The align stage 306 extracts memory operands from the retrieved data and aligns the memory operands for execution. The execute stage 307 performs arithmetic, logical, or other prescribed operations to generate results. The store stage 308 writes results or register operands to memory using the address calculated in the address stage 304. The write back stage 309 updates registers in the register file with the results generated in the execute stage 307 or with memory operands retrieved from memory by the load stage 305.

The update forwarding cache 311 is a feature of the present invention that is described in U.S. patent application Ser. No. 09/434086, filed on Nov. 5, 1999. entitled UPDATE FORWARDING CACHE FOR ADDRESS MODE, now issued U.S. Pat. No. 6,442, 673, by common inventors, and having the same assignee as this application, which is herein incorporated by reference. In the referenced application, the update forwarding cache 311 is provided as a temporary storage means for address operands computed in the address stage 304 that may be required by following micro instructions. For example, some registers in an x86-compatible microprocessor implicitly contain addresses such as a stack pointer register (i.e., register ESP) or string pointer registers (i.e., registers ESI and EDI). When certain stack manipulation instructions (e.g., PUSH or POP) or string manipulation instructions (e.g., MOVS, CMPS, or LODS) proceed through the address stage 304, the contents of these registers are automatically modified. And the update forwarding cache 311 is provided in the referenced application to preclude AGIs associated with the execution of address-dependent micro instructions that reference stack manipulation and string pointer registers.

The present inventors now exploit availability of the update forwarding cache 311 by incorporating logic in the address stage 304 to detect addition and subtraction micro instructions that do not prescribe memory operands, and to speculatively perform the arithmetic operations prescribed by these micro instructions to generate intermediate results. The intermediate results are temporarily stored in the update forwarding cache 311 and are made available to following address-dependent micro instructions in the form of speculative address operands. Following address-dependent micro instructions obtain these speculative address operands from the update forwarding cache 311 upon entry into the register stage 303, prior to when final results corresponding to the addition and subtraction micro instructions are generated by execute logic in the execute stage 307. The operands obtained from the update forwarding cache 311 are referred to as speculative address operands because they do no reflect the final results of micro instructions that have completed execution in the pipeline without error or exception. But for micro instructions that do complete execution without error or exception, the intermediate results of the arithmetic operations generated in the address stage 304 are identical to the final results generated in the execute stage 307. By utilizing logic in the address stage 304 that would not otherwise be employed by arithmetic register/register and register/immediate micro instructions, the present invention affords a significant performance improvement for present day microprocessors.

As an address-dependent micro instruction proceeds through the register stage 303, it provides an operand tag, OPERAND TAG, to the update forwarding cache 311 prescribing a register that is to contain an address operand. The address operand corresponds to the final result of a preceding micro instruction, where the final result has not yet been generated by execute logic in the execute stage 307 and written back by write back logic 309 to the register so that it is available for access by following micro instructions. But if the preceding micro instruction is an arithmetic micro instruction as described above, then its interim result is already generated and available within the update forwarding cache 311. The update forwarding cache 311 thus accesses the interim result and configures a speculative address operand and provides it to the address-dependent micro instruction, thereby allowing the address-dependent micro instruction to proceed without experiencing an AGI.

The update forwarding cache 311 is an array of storage elements for storing multiple intermediate address/result operands along with associated tag information for a corresponding number of preceding micro instructions, that is, the number of previously modified intermediate address operands/results which are required to configure and provide a speculative address operand to an address-dependent micro instruction proceeding through the register stage 303. Since more than one intermediate address operand or interim result may be destined for the same register in the register file, the update forwarding cache 311 also maintains information pertaining to each intermediate operand/result indicating its relative priority for substitution purposes. In one embodiment, the update forwarding cache 311 contains four storage elements corresponding to four preceding intermediate address operands/results. Thus, when a micro instruction proceeds through the register stage 303, its address operand register tag is provided to the update forwarding cache 311. The update forwarding cache 311, in turn, configures a speculative address operand from the most recently generated words of intermediate operands/results therein whose register tags match the provided register tag. In addition, the update forwarding cache 311 provides speculative address operands in accordance the address mode (i.e., 16-bit or 32-bit) that is specified. Details concerning operation of the update forwarding cache 311 according to the present invention are more specifically discussed with reference to FIG. 4.

Figure 4:
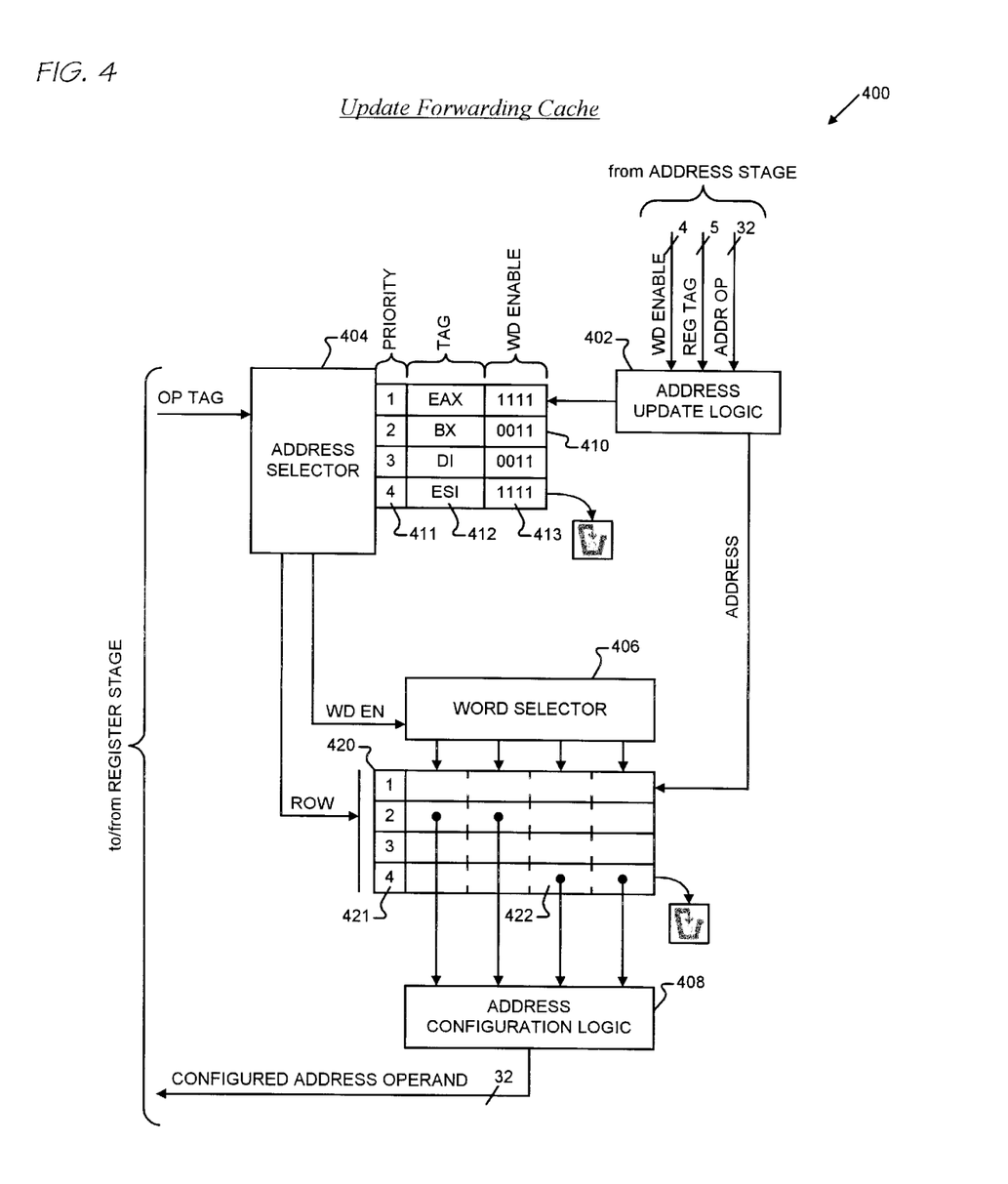
FIG. 4 is a block diagram illustrating details of an update forwarding cache according to the present invention.

Referring to FIG. 4, a block diagram is presented illustrating details of an update forwarding cache 400 according to the present invention. In one embodiment, the update forwarding cache 400 has an address selector 404 that receives an address operand tag from an address-dependent micro instruction in the register stage of a microprocessor according to the present invention. The address operand tag designates a corresponding address operand register in a register file and also prescribes the address mode (i.e., the address operand size: 16-bit or 32-bit). The address selector 404 is coupled to a tag array 410. Buffer entries in the tag array 410 each have a priority field 411, an intermediate operand/result register field 412, and a word enable field 413. The tag buffer 410 receives its entries from update logic 402. The update logic 402 is coupled to address stage logic in a microprocessor according to the present invention.

The update logic 402 provides intermediate address operands or intermediate arithmetic operation results to an intermediate operand/result array 420 having entries that correspond to entries in the tag array 410. Each entry in the intermediate operand/result array 420 has a corresponding priority field 421 and an intermediate operand/result field 422.

The intermediate operand/result array 420 is indexed by the address selector 404 and a word selector 406. Outputs from the intermediate operand/result buffers 420 are provided to speculative address operand configuration logic 408. The speculative operand configuration logic 408 provides a configured speculative address operand back to the requesting micro instruction in the register stage.

Operationally, each time the address stage logic executes a micro instruction that generates an intermediate address operand/result, ADDR OP, it is provided to the update logic 402 along with a corresponding operand/result register tag, REG TAG, and a operand/result size specifier, WD ENABLE. ADDR OP is written to a most recently generated entry in the intermediate operand/result array 420, in this embodiment, the entry having priority field 421 equal to 1. In parallel, the tag and size specifiers are written to the corresponding most recently generated entry in the tag array 410 (priority 1). When a new intermediate operand/result is entered into the update forwarding cache 400, contents of the tag array 410 and intermediate operand/result array 420 are manipulated such that a least recently generated intermediate operand/result and corresponding tag and size specifiers are cast out or the arrays 410, 420. One skilled in the art will appreciate that manipulating the array contents is just one technique available for indicating priority. In an alternative embodiment, the least recently generated address operand data is simply overwritten by the most recently generated address operand and the priority fields 411, 421 are modified. Thus, the four most recently generated intermediate operands/results are maintained in the embodiment of the update forwarding cache 400 presented in FIG. 4. For example, contents of the tag array 410 indicate that the most recently generated intermediate operand/result (i.e., priority 1) comprises a 32-bit intermediate result corresponding to destination register EAX in the register file. The intermediate operand/result corresponding to priority 2 (i.e., the intermediate operand/result generated prior to the priority 1 intermediate operand/result) comprises a 16-bit intermediate result corresponding to register BX in the register file. The priority 3 intermediate operand/result is a 16-bit address operand corresponding to address register DI. And the priority 4 intermediate operand/result is a 32-bit address operand destined for address register ESI.

In one embodiment, when a micro instruction proceeds through the register stage, its operand/result tag, OP TAG, is provided to the address selector 404. The address selector 404 evaluates tag array entries to select the most recently written intermediate operand/result words that have corresponding destination registers matching the operand's tag. In addition, words are selected based upon the address mode (i.e., the size) of the specified address operand tag and that of the intermediate operands/results. In one embodiment, the address selector 404 enables words in the intermediate operand/result array 420 for configuration of the speculative address operand by providing row and column information via the WD EN, and ROW signals.

The enabled words in the intermediate operand/result array 420 are passed to the speculative address operand configuration logic 408. The speculative address operand configuration logic 408 assembles the enabled words into the operand and provides the speculative address operand to a requesting address-dependent micro instruction in the register stage. One skilled in the art will appreciate that increasing the number of stages in a microprocessor according to the present invention requires only additional entries in the tag array 410 and intermediate operand/result array 420. Neither timing requirements nor power requirements for the update forwarding cache 400 would be negatively impacted by an increase in the number of pipeline stages.

Figure 5:
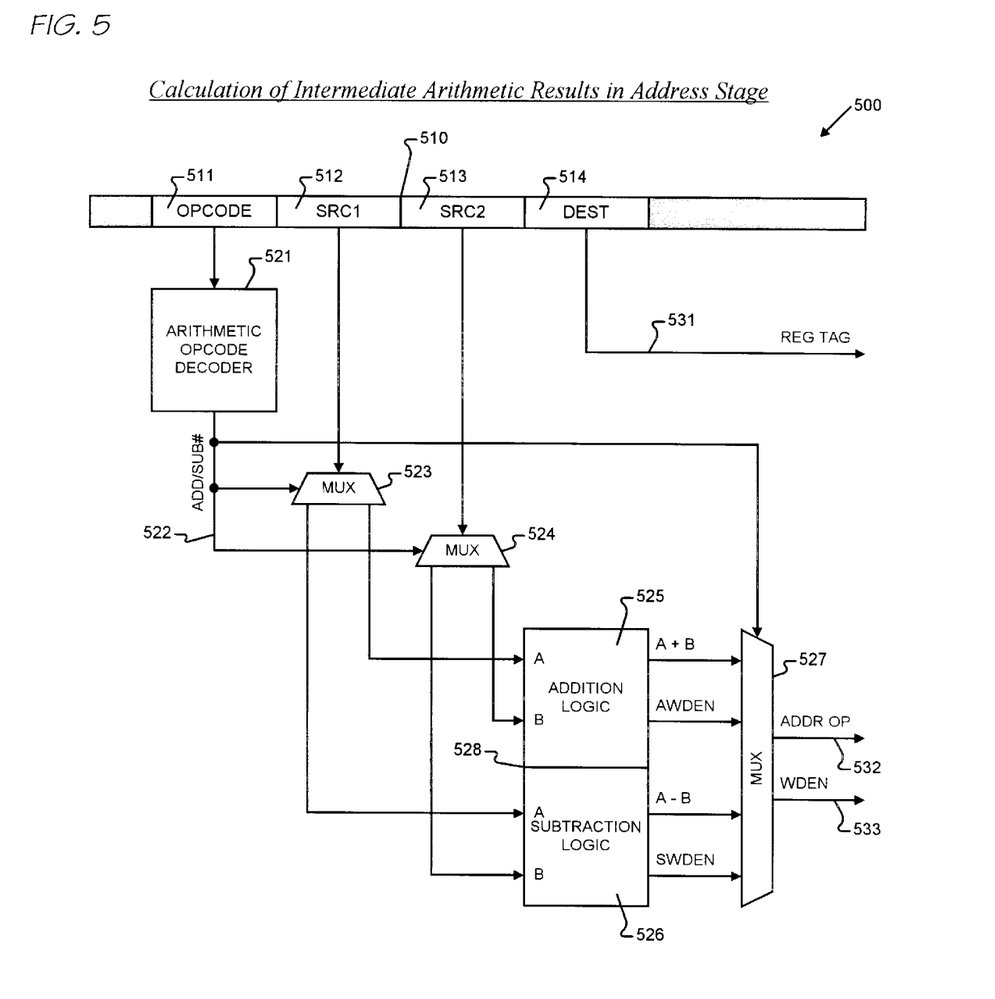
FIG. 5 is a block diagram illustrating interim arithmetic result calculation logic within the address stage of a microprocessor according to the present invention.

Now referring to FIG. 5, a block diagram is presented illustrating interim arithmetic result calculation logic 500 within the address stage of a microprocessor according to the present invention. In one embodiment, the interim result calculation logic 500 includes an arithmetic opcode decoder 521 that reads an opcode field 511 from a micro instruction register 510. The arithmetic opcode decoder 521 provides an arithmetic operation selection output 522, ADD/SUB#, to a first input mux 523, a second input mux 524, and an intermediate result mux 527. A first source operand field 512 of the micro instruction register 510 is provided to the first input mux 523. A second source operand field 513 of the micro instruction register 510 is provided to the second input mux 524. Outputs of the first and second input muxes 523, 524 are routed to intermediate result calculation logic 528. The intermediate result calculation logic 528 includes an adder 525 and a subtractor 526. In one embodiment, the adder 525 is the address computation logic used within the address stage for calculation of memory addresses. The adder 525 provides a sum output, A+B, and a word enable output, AWDEN, to the intermediate result mux 527. The subtractor 526 provides a difference output, A−B, and a word enable output, SWDEN, to the intermediate result mux 527. The intermediate result mux 527 provides an interim result output 532, ADDR OP, and a word enable output 533, WDEN, to an update forwarding cache according to the present invention. In addition, contents of a destination register field 514 from the micro instruction register 510 are routed to the update forwarding cache via bus 531, REG TAG.

In operation, when a micro instruction proceeds through the address stage, the arithmetic opcode detection logic 521 evaluates the micro instruction's opcode 511 to determine if it falls into the class of instructions for which intermediate arithmetic results are generated. In one embodiment, all addition and subtraction micro instructions that do not prescribe operands in memory are speculatively executed to generate intermediate results. In a x86-compatible microprocessor embodiment, these addition and subtraction micro instructions are generated from the following x86 macro instructions: ADD, SUB, MOV, INC, and DEC. The arithmetic opcode detector 521 routes the first and second source operands 512, 513 either to the adder 525 or the subtractor 526 by controlling muxes 523, 524 via ADD/SUB#, 522. ADD/SUB#, 522 also controls the routing of intermediate results via mux 527 to the update forwarding cache.

If an addition micro instruction is detected, the opcode decoder 521 routes the source operands 512, 513 to the adder 525, and the result of the addition operation, A+B, along with corresponding word enable, AWDEN, are provided to the update forwarding cache via ADDR OP 532 and WDEN 533. If a subtraction micro instruction is detected, the opcode decoder 521 routes the source operands 512, 513 to the subtraction logic 526, and the result of the subtraction operation, A−B, along with corresponding word enable, SWDEN, are provided to the update forwarding cache via ADDR OP 532 and WDEN 533.

Figure 6:
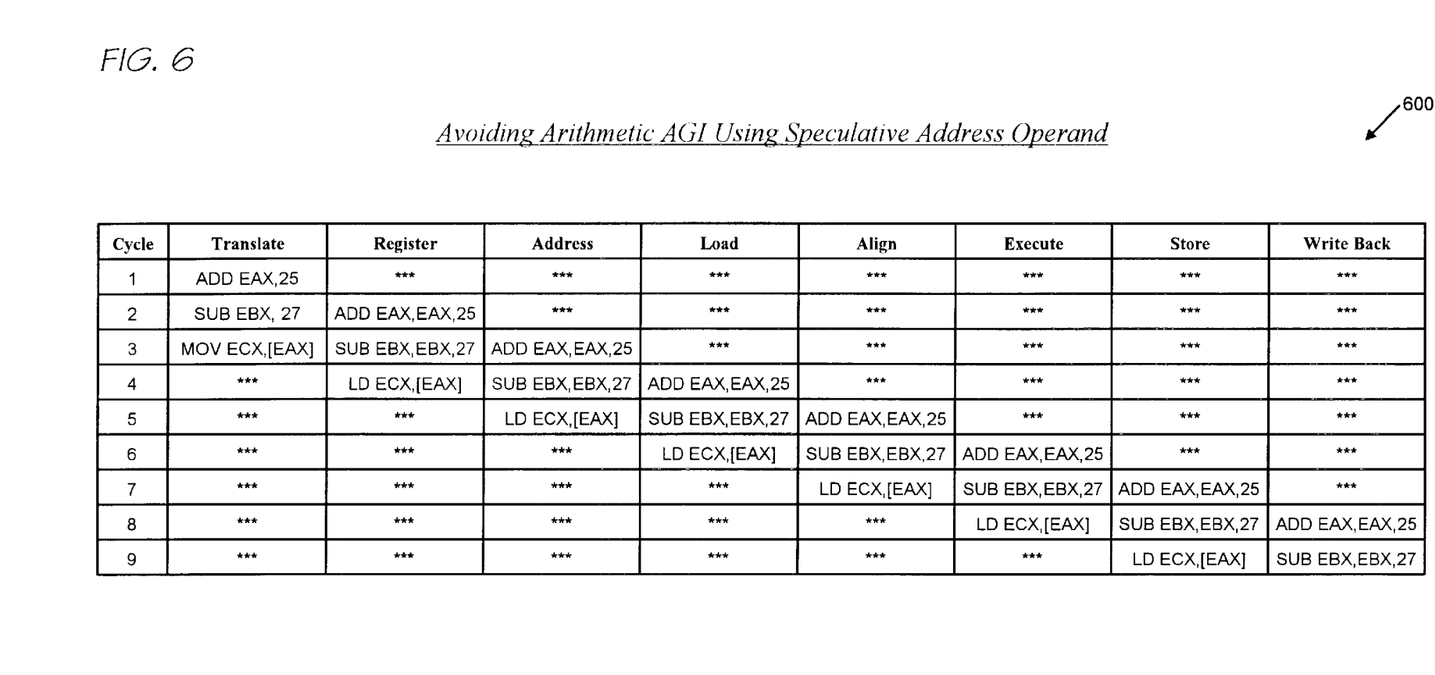
FIG. 6 is a table illustrating execution of an address-dependent micro instruction by a microprocessor according to the present invention.

Now referring to FIG. 6, a table 600 is presented illustrating execution of an address-dependent micro instruction by a microprocessor according to the present invention as described with reference to FIGS. 3 through 5. Three macro instructions, a first macro instruction, designated ADD EAX,25; a second macro instruction, designated SUB EBX,27; and a third macro instruction, designated MOV ECX, [EAX]; are shown in the Translate column of the table 600. For clarity of discussion, a column corresponding to the Fetch stage 301 is not shown. The marks * * * designate non-relevant instructions before or after the instructions of interest. Progression of instructions through noted stages of the pipeline is shown with respect to cycles of a pipeline clock.

The ordering of the three macro instructions in the Translate column is the same as that discussed with reference to FIG. 2, and thus illustrates an address-dependency case which would otherwise result in an AGI. More specifically, the first macro instruction directs logic in the execute stage 307 of the microprocessor 300 to add the contents of register EAX in the register file with a first immediate operand, 25, and to write back the result of the addition into destination register EAX. The second macro instruction directs logic in the execute stage 307 of the microprocessor 300 to subtract a second immediate operand, 27, from the contents of register EBX in the register file, and write back the result of the subtraction into destination register EBX. The third macro instruction directs the microprocessor 300 to load the contents of a location in memory into register ECX. The address operand used to generate the address of the memory location is prescribed within register EAX. And register EAX is the destination register for the final result of the addition operation prescribed by the first macro instruction. Therefore, the third macro instruction is address-dependent upon the first macro instruction.

During cycle 1, the first macro instruction, ADD EAX,25, proceeds through the translate stage 302. Therein, the first macro instruction is decoded into a first micro instruction, designated ADD EAX,EAX,25. More specifically, an opcode field, ADD, prescribes the operation that is to performed, that is, to retrieve the contents of a source register, EAX, in the register stage 303, to add the contents of EAX with the first immediate operand, 25, and to write back the result of the addition generated in the execute stage 307 into destination register EAX.

During cycle 2, the first micro instruction proceeds through the register stage 303. Therein, contents of register EAX are retrieved from the register file. In addition during cycle 2, the second macro instruction, SUB EBX,27, proceeds through the translate stage 302. Therein, the second macro instruction is decoded into a second micro instruction, designated SUB EBX,EBX,27. More specifically, an opcode field, SUB, prescribes the operation that is to performed, that is, to retrieve the contents of a source register, EBX, in the register stage 303, to subtract the second immediate operand, 27, from the contents of EBX, and to write back the result of the subtraction generated in the execute stage 307 into destination register EBX.

During cycle 3, the first micro instruction proceeds through the address stage 304. Because an applicable addition operation is prescribed by the opcode 511 of the first micro instruction, the opcode detection logic 521 routes the contents of EAX and the first immediate operand, 25, to the adder 525. The intermediate result of this addition along with word enable data is muxed via buses 532, 533 to the update forwarding cache 400. In addition, contents of the destination register field 514, EAX, are provided to the cache 400 via tag bus 531. Also during cycle 3, the second micro instruction proceeds through the register stage 303. Therein, the contents of register EBX are retrieved from the register file. In addition during cycle 3, the third macro instruction proceeds through the translate stage 302. Therein, the third macro instruction is decoded into a third micro instruction, designated LD ECX,[EAX]. More specifically, an opcode field, LD, prescribes the operation that is to performed, that is, to load the contents of a memory location into register ECX. The address operand used to compute the address of the memory location is contained within the update forwarding cache 400 corresponding to a tag identifying register EAX as a destination register.

During cycle 4, the first micro instruction proceeds through the load stage 305. Also during cycle 4, the second micro instruction proceeds through the address stage 304. Because a subtraction operation is prescribed by the opcode 511 of the second micro instruction, the opcode detection logic 521 routes the contents of EBX and the second immediate operand, 27, to the subtraction logic 526. The interim result of this subtraction along with word enable data is muxed via buses 532, 533 to the update forwarding cache 400. In addition, contents of the destination register field 514, EBX, are provided to the cache 400 via tag bus 531. Also during cycle 4, in contrast to the example discussed with reference to FIG. 2, interlock logic (not shown) within the microprocessor 300 according to the present invention permits the third micro instruction to proceed through the register stage 303 without incurring a stall-even though its address operand depends upon the result of the first micro instruction. Within the register stage 303, the third micro instruction submits operand tag EAX to the update forwarding cache 400. In response, since the intermediate result of the first micro instruction destined for register EAX is available within the cache 400, the address configuration logic 408 configures a speculative address operand and provides the speculative address operand to the third micro instruction.

During cycle 5, the first and second micro instructions to proceed through the align stage 306 and the load stage 305, respectively. In addition during cycle 5, the third micro instruction proceeds through the address stage 304. Therein, the memory address for the load operation is computed by address calculation logic using the speculative address operand for register EAX obtained from the update forwarding cache 400 during cycle 4.

During cycle 6, the first micro instruction proceeds through the execute stage 307. Therein, the addition operation prescribed is performed and a final result of the addition is generated. In addition during cycle 6, the second micro instruction proceeds through the align stage 306. Also during cycle 6, the third micro instruction proceeds through the load stage 305. Therein, a load operation is performed from memory using the address that was computed during cycle 5.

During cycles 7 through 9, the three micro instructions continue to proceed through subsequent stages of the microprocessor 300. And in contrast to the example discussed with reference to FIG. 2, the address-dependent micro instruction is not delayed. No AGIs are incurred because intermediate arithmetic results are computed by intermediate arithmetic result computation logic 500 when applicable instructions proceed through the address stage 304 and speculative address operands are provided to address-dependent micro instructions when they proceed through the register stage 303.

The present invention overcomes the problems associated with a significant number of address dependency cases by providing a means whereby intermediate results of arithmetic operations are computed and retained, thereby allowing an address-dependent micro instruction to be provided with a speculative address operand in a pipeline stage immediately preceding the stage in which an address computation is required.

Although the present invention and its objects, features, and advantages have been described in detail, other embodiments are encompassed by the invention. For example, the present invention has been particularly characterized in terms of a microprocessor pipeline comprising nine pipeline stages. Although a nine-stage pipeline is representative of most present day architectures, the present invention is not limited by this configuration. As alluded to above, the number of intervening stages in the pipeline simply determine the number of intermediate operand/result entries and corresponding register tag entries that are required in the update forwarding cache.

In addition, the present invention has been characterized in terms of x86-compatible instructions for execution on an x86-compatible microprocessor. It is noted, however, that the present invention comprehends any microprocessor, array processor, micro controller, signal processor, or similar device that processes address-dependent instructions that depend upon preceding instructions directing arithmetic operations utilizing register/register or register/immediate operands.

Moreover, the present invention comprehends microprocessor architectures that are different than the 32-bit embodiment described herein. A 64-bit, or even a 128-bit intermediate result calculator and update forwarding cache are comprehended by an embodiment having a modified address operand mode indicator and intermediate operand/result array.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. An apparatus in a pipeline microprocessor for providing a speculative address operand associated with a result of an arithmetic operation, the arithmetic operation being prescribed by a preceding micro instruction, the apparatus comprising:

speculative operand calculation logic, within an address stage of the pipeline microprocessor, configured to perform the arithmetic operation to generate the speculative address operand prior to when execute logic executes the preceding micro instruction to generate the result, wherein the speculative address operand is obtained from the result that is to be generated when said execute logic executes the preceding micro instruction, and wherein the result has not yet been generated by said execute logic and written to a register file for access by following micro instructions, and wherein the result is required by an address-dependent micro instruction within said address stage for computation of a memory address, wherein said speculative operand calculation logic comprises:

addition logic, configured sum a first source operand with a second source operand, said source operands being prescribed by the preceding micro instruction;

an arithmetic opcode decoder, configured to direct said addition logic to sum said source operands if the arithmetic operation prescribed by the preceding micro instruction is an addition operation; and subtraction logic, coupled to said arithmetic opcode decoder, configured to subtract said second source operand from said first source operand;

wherein, if the arithmetic operation is a subtraction operation, said arithmetic opcode decoder directs said subtraction logic to subtract said second source operand from said first source operand; and an update Forwarding cache, coupled to said speculative operand calculation logic, configured to tenporarily store the speculative address operand, wherein said address-dependent micro instruction can retrieve the speculative address operand, thereby permitting said address-dependent micro instruction to proceed without incurring delay, and wherein the speculative address operand is provided by said update forwarding cache to said address-dependent micro instruction prior to when said address-dependent micro instruction enters said address stage, thereby allowing said address-dependent micro instruction to generate said memory address without incurring said delay, and wherein said update forwarding cache comprises a plurality of cache buffers, each of said plurality of cache buffers corresponding to each of a plurality of speculative operands.

2. The apparatus as recited in claim 1, wherein said each of said plurality of cache buffers comprises:
- an address field, for storing one of said plurality of speculative operands;
- a tag field, for identifying a corresponding operand register in said register file into which said one of said plurality of speculative operands is to be entered; and
- a word enable field, for designating words in said address field that are valid when said one of said plurality of speculative operands is entered into said update forwarding cache.

3. The apparatus as recite in claim 2, wherein said plurality of cache buffers comprises four cache buffers.

4. A speculative operand apparatus in a pipeline microprocessor, comprising:
- address stable logic, for Generating a memory address prescribed by an address-dependent micro instruction, wherein said address state logic comprises:
  - a speculative address operand calculator, for generating a first interim result by performing an arithmetic operation prescribed by a preceding micro instruction, wherein said preceding micro instruction corresponds to one of the following x86 macro instructions: ADD, MOV, INC, SUB, or DEC, and wherein said arithmetic operation is performed prior to generation of a final result by said preceding micro instruction, and wherein said final result is generated when said preceding micro instruction is executed by execute logic within the pipeline microprocessor, and wherein said final result is stored in a register for access by following, micro instructions, and wherein said speculative address operand calculator comprises:
    - an adder, for summing a first source operand with a second source operand, said source operands being prescribed by said preceding micro instruction;
    - arithmetic opcode decoding, logic, configured to direct said adder to sum said source operands if said arithmetic operation is an addition operation; and
    - a subtractor, coupled to said arithmetic opcode decoding logic, for subtracting said second source operand from said first source operand;
    - wherein, if said arithmetic operation is a subtraction operation, said arithmetic opcode decoding logic directs said subtractor to subtract said second source operand from said first source operand;
  - a speculative operand cache, coupled to said address stable logic, for temporarily storing said first interim result, wherein said speculative operand cache comprises a plurality of cache buffers, each of said plurality of cache buffers corresponding to each of a plurality of interim results; and
- speculative operand configuration logic, coupled to said speculative operand cache, for accessing said first interim result to configure a speculative address operand corresponding to contents of said register prescribed by said address-dependent micro instruction, thereby permitting said memory address to be generated in lieu of a stall.

5. The speculative operand apparatus as recited in claim 4 wherein said plurality of cache buffers comprises four cache buffers.

6. The speculative operand apparatus as recited in claim 4, wherein said speculative operand configuration logic configures said speculative address operand and provides said speculative address operand to said address-dependent micro instruction after said address-dependent micro instruction has accessed said register and prior to when said address-dependent micro instruction requires said contents of said register for calculation of said memory address.

7. The speculative operand apparatus as recited in claim 6, wherein each time a most recently generated interim result is entered into a most recently generated cache buffer, contents of said speculative operand cache are shifted such that a least recently generated interim result is shifted out of a least recently generated cache buffer.

8. A microprocessor apparatus for providing a speculative operand to an address-dependent micro instruction, the speculative operand corresponding to a result of a preceding arithmetic micro instruction, wherein the result is yet to be generated by execute stage logic in the microprocessor, the apparatus comprising:
- an opcode decoder, for evaluating an opcode of the preceding arithmetic micro instruction;
- intermediate result calculation logic, coupled to said opcode decoder, for generating intermediate results corresponding to arithmetic micro instructions, said intermediate result calculation logic comprising:
  - addition logic, for generating additive intermediate results; and
  - subtraction logic, for generating subtractive intermediate results; and
- operand cache entries, coupled to said intermediate result calculation logic, for temporarily storing said additive intermediate results and said subtractive intermediate results; and
- speculative operand configuration logic, coupled to said operand cache entries, for selecting words from selected operand cache entries to configure the speculative operand.

9. The microprocessor apparatus as recited in claim 8, wherein the result is placed in a register file for access by following micro instructions following generation of the result by the execute stage logic.

10. The microprocessor apparatus as recited in claim 9, wherein the preceding arithmetic micro instruction corresponds to one of the following x86 macro instructions: ADD, MOV, INC, SUB, or DEC.

11. The microprocessor apparatus as recited in claim 10, comprising four operand cache entries.

12. The microprocessor apparatus as recited in claim 10, wherein said speculative operand configuration logic provides said speculative address operand to the address-dependent micro instruction after the address-dependent micro instruction has accessed said register file and prior to when the address-dependent micro instruction requires contents of said register file for calculation of a memory address.

* * * * *